US012525636B2

(12) United States Patent
Hald et al.

(10) Patent No.: US 12,525,636 B2
(45) Date of Patent: Jan. 13, 2026

(54) ELECTROCHEMICAL ENERGY STORAGE CELL

(71) Applicant: VARTA Microbattery GmbH, Ellwangen Jagst (DE)

(72) Inventors: Rainer Hald, Ellwangen (DE); Werner Schreiber, Meine (DE)

(73) Assignee: VARTA Microbattery GmbH, Ellwangen Jagst (DE)

( * ) Notice: Subject to any disclaimer, the term of this patent is extended or adjusted under 35 U.S.C. 154(b) by 9 days.

(21) Appl. No.: 17/386,643

(22) Filed: Jul. 28, 2021

(65) Prior Publication Data
US 2022/0037692 A1    Feb. 3, 2022

(30) Foreign Application Priority Data

Jul. 28, 2020  (EP) .................................... 20188156

(51) Int. Cl.
*H01M 10/04*    (2006.01)
*H01M 10/0587*  (2010.01)
*H01M 10/0525*  (2010.01)

(52) U.S. Cl.
CPC ... *H01M 10/0431* (2013.01); *H01M 10/0427* (2013.01); *H01M 10/0587* (2013.01); *H01M 10/0525* (2013.01)

(58) Field of Classification Search
CPC ......... H01M 10/0431; H01M 10/0427; H01M 10/0587; H01M 10/0525
(Continued)

(56) References Cited

U.S. PATENT DOCUMENTS 5,047,068 A * 9/1991 Stoklosa ................. H01M 6/14
29/730
5,882,815 A * 3/1999 Tagawa ................... H01M 6/10
429/208
(Continued)

FOREIGN PATENT DOCUMENTS

DE   20 2015 004 285 U1   10/2016
EP       2 693 523 A2      2/2014
(Continued)

OTHER PUBLICATIONS

Office Action dated Apr. 21, 2025, from counterpart Chinese Patent Application No. 202110853537.2.
(Continued)

*Primary Examiner* — Anca Eoff
*Assistant Examiner* — Omar M Kekia
(74) *Attorney, Agent, or Firm* — DLA Piper LLP (US)

(57) ABSTRACT

An energy storage cell includes a cylindrical housing that encloses an interior space and a housing casing, a wound composite body arranged in the interior space and having a helical structure including at least two electrode strips and at least one separator strip arranged between the electrode strips, each including a strip-shaped current collector having an active material coating, the wound composite body includes two terminal end faces, a circumferential outer composite body lateral surface and a circumferential inner composite body lateral surface, the inner composite body lateral surface defines an axially oriented cavity, a winding core having a substantially cylindrical or hollow cylindrical shape and has an outer circumferential surface that rests flat on the inner composite body lateral surface, and the winding core has a local deviation from the cylindrical or hollow cylindrical shape in at least one region of the outer circumferential surface.

11 Claims, 7 Drawing Sheets

(58) Field of Classification Search
USPC .......................................................... 429/94
See application file for complete search history.

(56) References Cited

U.S. PATENT DOCUMENTS

| | | | |
|---|---|---|---|
| 10,804,506 B2 | 10/2020 | Gaugler | |
| 2003/0134184 A1 | 7/2003 | Skinlo et al. | |
| 2006/0263673 A1* | 11/2006 | Kim | H01M 50/578 429/514 |
| 2009/0280403 A1* | 11/2009 | Han | H01M 10/0431 429/163 |
| 2011/0052974 A1* | 3/2011 | Kim | H01M 50/107 429/164 |
| 2011/0217576 A1 | 9/2011 | Ueda et al. | |
| 2011/0229747 A1 | 9/2011 | Mitani et al. | |
| 2017/0025703 A1* | 1/2017 | Pytlik | H01M 10/0427 |
| 2018/0258740 A1 | 9/2018 | Logan et al. | |
| 2018/0261805 A1 | 9/2018 | Logan et al. | |
| 2018/0331399 A1* | 11/2018 | Shimizu | H01M 10/425 |
| 2020/0259220 A1* | 8/2020 | Bernard | H01M 10/4257 |

FOREIGN PATENT DOCUMENTS

| | | |
|---|---|---|
| JP | 2003217668 A | 7/2003 |
| WO | 2010/089152 A1 | 8/2010 |
| WO | 2010/146154 A2 | 12/2010 |
| WO | 2012/048995 A1 | 4/2012 |

OTHER PUBLICATIONS

Office Action dated Sep. 25, 2025, from counterpart Chinese Application No. 202110853537.2.

* cited by examiner

ELECTROCHEMICAL ENERGY STORAGE CELL

TECHNICAL FIELD

This disclosure relates to an electrochemical energy storage cell having a cylindrical housing and a wound composite body shaped in a hollow cylindrical manner and a method of producing such an electrochemical energy storage cell.

BACKGROUND

An electrochemical energy storage cell is understood as meaning an electrochemical cell comprising at least one positive electrode and at least one negative electrode that are separated from one another by a separator, and can absorb, store and, if necessary, release electrical energy. When absorbing (charging the cell) and releasing (discharging the cell) the electrical energy, an electrochemical reaction takes place and is composed of two partial reactions that are electrically coupled to one another, but are spatially separate from one another. A partial reaction taking place at a comparatively lower redox potential takes place at the negative electrode and a partial reaction at a comparatively higher redox potential takes place at the positive electrode. During discharging, electrons are released at the negative electrode by virtue of an oxidation process, resulting in a flow of electrons via an outer load to the positive electrode, which absorbs a corresponding quantity of electrons. A reduction process therefore takes place at the positive electrode. At the same time, for the purpose of charge equalization, an ion current corresponding to the electrode reaction results inside the electrochemical cells. This ion current crosses the separator and is ensured by an ion-conducting electrolyte.

In secondary (rechargeable) electrochemical energy storage cells, the discharging reaction is reversible, that is to say it is possible to reverse the conversion of chemical energy into electrical energy that took place during discharging.

If the terms "anode" and "cathode" are used in connection with secondary electrochemical energy storage cells, the electrodes are usually named according to their discharge function. The negative electrode in such cells is therefore the anode and the positive electrode is the cathode.

The electrodes and separators in energy storage cells are often provided in the form of composite bodies. Such a composite body may be a cell stack comprising a plurality of cells. However, the composite body usually has a structure made of wound electrodes and separators (wound composite body).

In the composite bodies, positive and negative electrodes that are preferably in the form of flat strips coated on both sides, and separators or separator strips usually lie flat on one another. In that structure, the electrodes and separators may be connected to one another, for example, by lamination or adhesive bonding. Composite bodies, regardless of whether or not they are wound, generally comprise the sequence: positive electrode/separator/negative electrode. Composite bodies are often also produced in the form of so-called bicells having the possible sequences: negative electrode/separator/positive electrode/separator/negative electrode or positive electrode/separator/negative electrode/separator/positive electrode.

The strip-like electrodes usually each comprise an electrically conductive current collector and electrochemically active components (often referred to as active materials) and electrochemically inactive components. The current collectors are used to make electrical contact with the electrochemically active components over the largest possible area. They usually comprise strip-like flat metal substrates, for example, made of metal foils or a metal foam or a metal mesh or a metal lattice or a metallized non-woven fabric. Porous plastic films, for example, made of a polyolefin or a polyether ketone, are possible, in particular, as separators for the wound composite bodies.

To produce electrodes for wound composite bodies, pastes (comprising the mentioned electrochemically active components and, as an electrochemically inactive component, an electrode binder (and possibly a conductive means)) in the form of thin layers are usually applied to the current collectors, dried and changed to the desired shape. The layers are usually rolled and pressed after drying.

To produce the wound composite body, strip-like positive and negative electrodes formed in this manner are supplied, together with one or more strip-like separators, to a winding apparatus and are preferably helically wound around a winding axis in the apparatus. For that purpose, the electrodes and the separator are often wound onto a cylindrical or hollow cylindrical winding core which sits on a winding mandrel and remains in the wound composite body after winding. In other configurations, the winding can also be produced without a central winding core by directly forming the electrode assembly on the winding mandrel. The winding operation is aborted after a usually predefined number of turns (in that structure, a turn is understood as meaning each complete revolution of an electrode around the winding core or the winding mandrel, for example). This generally results in a wound composite body having a hollow cylindrical shape which has an inner, axially oriented cavity.

Electrical contact can be made with the electrodes of the wound composite body, for example, by arrester lugs that emerge from the end faces of the wound composite body formed. The arrester lugs can be welded to the current collectors or may be a part of the latter.

Cylindrical designs are widespread in electrochemical energy storage cells, wherein the electrodes are generally situated, as part of a hollow cylindrical wound composite body, in the interior of a cylindrical housing. In particular, they may be cylindrical round cells or button cells.

Such an energy storage cell is disclosed, for example, in DE 20 2015 004 285 U1. The basic structure of button cells having lithium-ion-based windings produced by helically winding strip-like electrodes and at least one strip-like separator is also known, for example, in WO 2010/146154 A2, WO 2012/048995 A1 and WO 2010/089152 A1.

The problem with such energy storage cells having a helically constructed wound composite body are locally occurring irregularities in the helical structure of the wound composite body. Such irregularities preferably occur in regions in which one of the wound electrode strips ends and/or there is a sudden change in the thickness of one of the electrode strips. Each of the electrode strips of a winding has an inner end close to the winding core or the axially oriented cavity and an outer end close to the outer side of the winding. The distance between the electrode strips and the winding axis increases continuously over virtually the entire length of the electrode strips starting from their inner end to their outer end. An irregularity results from a locally occurring discontinuity with respect to a change in the distance between the electrode strips and the winding axis. A sudden change in the thickness and/or an end of an electrode strip can cause sudden direction changes in turns of adjacent electrode strips, which direction changes can locally result in mechanical loads if the electrode strips are subject to volumetric changes during charging and discharging since pressures occurring are not uniformly distributed. The problem is, in particular, the volume expansion of the anode or the anodic coating when charging the energy storage cell. As a result, the diameter of the entire wound composite body increases overall, thus resulting in a pressure being exerted by the wound composite body in the direction of the winding core arranged in the center of the wound composite body and also in the direction of the housing surrounding the wound composite body.

The mechanical loads that occur can have a very disadvantageous effect on the function of the energy storage cell. In addition to mechanical damage of the separator, for example, which can result from a collision with a current collector, for example, the ion exchange can be hindered or, in lithium ion cells, lithium plating can even result. Lithium plating is generally understood as meaning deposition and accumulation of metallic lithium on the anode. This can result in formation of dendrites, wherein the dendrites pierce the separator and can therefore cause a short circuit between the anode and the cathode.

It could therefore be helpful to provide a structure that avoids non-uniform pressure distributions within the energy storage cell that occur during charging and discharging, with the result that the ion exchange is not hindered and plating is prevented.

SUMMARY

We provide an electrochemical energy storage cell including:
a. a cylindrical housing that encloses an interior space and has a top side and an underside and a circumferential housing case in between,
b. the housing casing has an inner housing lateral surface that delimits the interior to the outside,
c. a wound composite body shaped in a hollow cylindrical manner is arranged in the interior space and has a helical structure including at least two electrode strips helically wound around a winding axis and at least one separator strip arranged between the electrode strips,
d. the electrode strips each include a strip shaped current collector having an active material coating on both sides,
e. the wound composite body shaped in a hollow cylindrical manner includes two terminal end faces, a circumferential outer composite body lateral surface and a circumferential inner composite body lateral surface,
f. the inner composite body lateral surface defines an axially oriented cavity in the center of the wound composite body,
g. a winding core having a substantially cylindrical or hollow cylindrical shape is arranged in the axially oriented cavity and has an outer circumferential surface that rests flat on the inner composite body lateral surface, and
h. the winding core has a local deviation from the cylindrical or hollow cylindrical shape in at least one region of the outer circumferential surface.

We also provide a method of producing an electrochemical energy storage cell including:
a. arranging at least one separator strip between at least two electrodes strips each having a strip-like current collector with an active material coating on both sides,
b. providing a winding core having a substantially cylindrical or hollow cylindrical shape and an outer circumferential surface, wherein the outer circumferential surface of the winding core has a deviation from a cylindrical or hollow cylindrical shape in at least one region,
c. producing a wound composite body by helically winding the electrode strips and the at least one separator strip around the winding core to form a helical structure, wherein the winding is carried out such that the deviation is spatially assigned to a local defect in the helical structure,
d. providing a cylindrical housing for the energy storage cell,
e. introducing the wound composite body into the housing, and
f. electrically contacting the wound composite body and the housing and closing the housing.

DETAILED DESCRIPTION

Our electrochemical energy storage cell always has:
a. the energy storage cell has a cylindrical housing which encloses an interior and has a top side and an underside and a circumferential housing casing in between,
b. the housing casing has an inner housing lateral surface which delimits the interior to the outside,
c. a wound composite body shaped in a hollow cylindrical manner is arranged in the interior and has a helical structure comprising at least two electrode strips helically wound around a winding axis and at least one separator strip arranged between the electrode strips,
d. the electrode strips each comprise a strip-like current collector having an active material coating on both sides,
e. the wound composite body shaped in a hollow cylindrical manner comprises two terminal end faces, a circumferential outer composite body lateral surface and a circumferential inner composite body lateral surface,
f. the inner composite body lateral surface defines an axially oriented cavity in the center of the wound composite body, and
g. a winding core having a substantially cylindrical or hollow cylindrical shape is arranged in the axially oriented cavity and has an outer circumferential surface which rests flat on the inner composite body lateral surface.

The energy storage cell is also characterized by:
  h. the winding core has a local deviation from the cylindrical or hollow cylindrical shape in at least one region of the outer circumferential surface.

In other words, the outer circumferential surface of the winding core has at least one adaptation or change in its shape that deviates from a cylindrical shape or hollow cylindrical shape. These adaptations or changes are used to compensate for irregularities in the helical structure of the wound composite body.

The expression "in at least one region of the outer circumferential surface" means that it is entirely also possible to provide a plurality of regions having a local deviation from the cylindrical or hollow cylindrical shape. This need not necessarily be the same deviation in different regions. Rather, it is possible to provide two or more regions in which different deviations from the cylindrical or hollow cylindrical shape of the winding core are provided. When the following description refers to a local deviation in a region of the outer circumferential surface, this means a deviation according to the above-mentioned feature h.

The above-mentioned feature h. means that it is possible to compensate for pressure spikes that occur locally, in particular, in regions of irregularities of the helical structure of the wound composite body when charging or discharging the wound composite body. In particular, a pressure acting in a locally intensified manner in the central region of the wound composite body, which can occur during the charging process in particular, can be compensated for by the local deviation provided by our method in a region of the outer circumferential surface of the wound composite body. The above-described risk of hindering ion exchange and, in a lithium ion cell, the risk of lithium plating are considerably reduced in these regions, in particular. Overall, the reliability and service life of the energy storage cell can therefore be improved or extended.

The axially oriented cavity which is defined by the inner composite body lateral surface and is located in the center of the wound composite body preferably has openings on the two end faces. Preferably, the cavity is therefore partially filled by the winding core. If the winding core is not a hollow cylindrical winding core, but rather is a solid winding core, the cavity is completely filled.

The terminal end faces of the wound composite body shaped in a hollow cylindrical manner are, in particular, substantially circular end faces, wherein the expression "substantially" in this context relates to the fact that the irregularities that can occur in the helical structure of the wound composite body can result in a deviation from an ideal circular shape in certain regions.

The substantially cylindrical or hollow cylindrical shape of the winding core according to the above-mentioned feature g. relates to the fact that the winding core has a cylindrical or hollow cylindrical basic shape but, according to the above-mentioned feature h., one or possibly more deviations from the cylindrical or hollow cylindrical shape may be provided.

Preferably, the electrochemical energy storage cell has at least one of the immediately following additional features a. and b.:
  a. the helical structure of the winding comprises at least one local irregularity in at least one region in which one of the wound electrode strips ends and/or there is a sudden change in the thickness of one of the electrode strips, and
  b. the at least one region of the outer circumferential surface of the winding core, in which the local deviation from the cylindrical or hollow cylindrical shape occurs, is spatially assigned to a local irregularity of the wound composite body.

The immediately preceding features a. and b. are particularly preferably implemented in combination.

The local irregularities that can occur at different locations in the helical structure can be equated with the irregularities in the helical structure explained above. Regions in which one of the wound electrode strips ends and/or there is a sudden change in the thickness of one of the electrode strips occur, in particular, in the central region and in the outer region of the wound composite body. The irregularities in the helical shape of the wound composite body are expressed in this instance, in particular, in locally occurring discontinuities with respect to the change in the distance between electrode strips and the winding axis. For example, a sudden change in direction can occur in the region of the end of an electrode strip in an adjacent electrode strip overlapping the end.

It is generally preferred that the outer turns of the wound composite body are formed by the separator strips alone and can thus insulate the electrode strips to the outside. The outer and inner ends of the anode and cathode are also generally not at the same position in the electrode assembly. Each end of the anode and cathode in this example constitutes a defect in the winding structure and results in an irregularity in the winding structure.

It is also generally preferred that the current collectors of the electrodes are not terminally coated with electrode material. For example, the inner turns of the wound composite body may be formed solely by the anode current collector. A stepwise or sudden change in the thickness of the electrode strip and therefore a further defect occur at the position at which the coating with active material begins. Owing to the production process, a maximum thickness of the coating often occurs at the beginning and end of a coating with an electrode material, with the result that the irregularities are possibly intensified further in these regions.

Furthermore, defects may occur if the coatings on both sides of the cathode and/or of the anode are not exactly opposite at their starting points, but rather are offset. The coatings of the anode are particularly important, in particular, since the active material of the anode is often subject to particularly severe volume fluctuations during charging and discharging of the energy storage cell.

The consequences caused by the defects are intended to be compensated for by spatially assigning the local deviation in the region of the outer circumferential surface of the winding core to the local irregularity of the wound composite body. If there is a local pressure on the winding core as a result of a defect, for example, this pressure is compensated for by virtue of the winding core having a depression in which the wound composite body can relax.

The spatial assignment can be achieved, in particular, by virtue of the local deviation directly spatially adjoining the defect or the local irregularity.

The spatial assignment may also involve the local deviation in the region of the outer circumferential surface being cut from a straight line guided through the winding axis and the local irregularity in the helical structure.

The local deviation is particularly preferably spatially assigned to a local defect caused by a transition region in the active material coating of the anode.

Further particularly preferably, the energy storage cell is distinguished by at least one of the immediately following additional features a. and b.:

a. the local deviation from the cylindrical or hollow cylindrical shape involves a stepped or continuous reduction and/or expansion of the outer diameter of the winding core, and
b. the local deviation involves at least one stepped or continuous reduction and/or expansion of the outer diameter of the winding core, wherein the at least one stepped or continuous reduction and/or expansion of the outer diameter extends axially over preferably the entire height of the winding core.

The immediately preceding features a. and b. are particularly preferably implemented in combination.

The stepped or continuous reduction and/or expansion of the outer diameter of the winding core may be a local decrease or a local increase in the outer diameter, depending on the viewing direction of the observer. Particularly preferably, this reduction and/or expansion of the outer diameter, and therefore the local deviation, extends axially over preferably the entire height of the winding core. This is based on the fact that local defects, that is to say the described irregularities in wound composite bodies, generally also extend over the entire height of the wound composite bodies, with the result that the deviation can compensate for the axially extending defect in a particularly suitable manner by virtue of this configuration.

A stepped reduction and/or expansion of the outer diameter of the winding core, in particular, makes it possible to compensate for abrupt defects or other extreme defects in the helical structure of the wound composite body. It is likewise also possible to provide continuous reductions and/or expansions in the outer circumferential surface. Combinations of stepped and continuous reductions/expansions can also be provided, wherein a continuous reduction of the outer diameter and then a stepped expansion of the outer diameter can be provided in one direction, for example. This forms, as it were, an axially oriented notch in the outer circumferential surface of the winding core, wherein a soft incline is provided on one side and an abrupt incline is provided on the other side.

With respect to the configuration of the local deviation in the outer circumferential surface of the winding core, the electrochemical energy storage cell can also be distinguished by at least one of the following additional features a. and b.:
a. the local deviation in the at least one region of the outer circumferential surface of the winding core involves a depression in the outer circumferential surface of the winding core and/or a curvature of the outer circumferential surface of the winding core, and
b. the local deviation in at least one region of the outer circumferential surface of the winding core involves a depression in the outer circumferential surface of the winding core and/or a curvature of the outer circumferential surface of the winding core, wherein the depression and/or the curvature extend(s) axially over preferably the entire height of the winding core.

The immediately preceding features a. and b. are particularly preferably implemented in combination.

The depression in the outer circumferential surface of the winding core means, in particular, a concave indentation in the outer circumferential surface. The curvature means, in particular, a convex bulge of the outer circumferential surface.

Preferably, the depression extends over the entire height of the winding core, for example, in the form of a groove. The curvature may be in the form of a web, for example, which extends over the entire height of the winding core.

Provision may also be made for a depression and a curvature to be combined with one another to form a counterpart in the outer circumferential surface of the winding core for a defect to provide, on the one hand, a receiving area for excessively extending regions and, at the same time, to provide a stop to avoid displacement of the helical structure.

Using the different possibilities to configure the local deviation makes it possible to provide a winding core that is able to compensate for one or more local defects in the wound composite body. Depending on the degree of manifestation of the defect, an appropriate deviation, that can compensate for the non-uniform pressure distributions associated with the defect, can be implemented in a region of the outer circumferential surface. For example, a depression can be used to compensate for a locally increased extent of the wound composite body. A curvature in the outer circumferential surface of the winding core can be used, for example, to locally avoid a displacement of the helical structure if adjacent regions in the helical structure extend excessively. Accordingly, combinations of depressions and curvatures can be used in a particularly preferred manner.

Particularly preferably, the winding core has a local deviation from the cylindrical or hollow cylindrical shape in two or more regions of the outer circumferential surface, which local deviations are each spatially assigned to a local defect. In this example, the number of local deviations depends, in particular, on the number and position of the local defects in the respective wound composite body that arise when producing the wound composite body.

Particularly preferably, the energy storage cell is characterized by at least one of the immediately following features a. to c.:
a. the winding core is in the form of a hollow cylinder and has an inner core lateral surface that delimits an axially oriented cavity in the interior of the winding core,
b. the winding core has, as a local deviation, a depression in the outer circumferential surface and a corresponding curvature projecting into the axially oriented cavity, and
c. the winding core has, as a local deviation, a curvature of the outer circumferential surface and a corresponding depression in the inner core lateral surface.

The immediately preceding features a. and b. or a. and c. or a. to c. are particularly preferably implemented in combination.

If the local deviation of a hollow cylindrical winding core has an equivalent in the interior of the winding core, this has the advantage that the local deviation can be positioned accurately for the winding process by suitable tools, for example, by a winding mandrel which is of accordingly diametrically opposite design and introduced into the interior of the winding core. In particular, the above-described spatial assignment of the deviation to the local defects in the wound composite body can therefore be achieved in a particularly accurate and precise manner.

In this example, it is not absolutely necessary for the inner core lateral surface of the winding core to exactly emulate the outer circumferential surface with the deviation(s). A stepwise change in the outer circumference can also be emulated, for example, by a continuous change in the inner circumference.

Winding cores according to the immediately preceding features a. to c. have a substantially uniform wall thickness in a particularly preferred manner.

Particularly preferably, provision is made for the winding core to have, as a local deviation, the mentioned axially oriented notch or another axial depression in the outer circumferential surface of the winding core and for an end of one of the electrode strips or an end of one of the separator strips to be arranged in this depression.

This is based on the fact that the inner end of an electrode strip forms, in the winding direction, an edge, over which a subsequent winding is placed during winding, which almost necessarily results in a defect in the winding structure. This problem can be circumvented or at least reduced if the end is placed in the notch or in the depression. Ideally, the occurrence of an edge, over which winding must be carried out, can be completely avoided.

It is conventional to weld the electrode assembly to the winding core at the starting point of the winding when producing a wound composite body. The welding generally results in a local thickened portion which disrupts the structure of the immediately following and possibly further adjoining turns which are above the thickened portion. For example, a disruptive edge can also be formed by the welding.

When fastening the separator strip(s) in the notch or the depression in the outer circumferential surface of the winding core, the occurrence of thickened portions does not have any effects as long as a resulting edge does not project from the notch or depression.

Further preferably, the electrochemical energy storage cell is distinguished by the immediately following additional feature a.:
a. the local deviation in the at least one region of the outer circumferential surface of the winding core in the form of a hollow cylinder comprises an aperture in the wall of the winding core, in particular a slot in the wall.

The aperture in the wall may extend, in particular, over the entire height of the winding core. As a result of a slot formed in this manner or such a gap, the local deviation can act as a clamping element. For example, a separator strip can be clamped into the slot at the beginning of a winding process, with the result that there is no need to weld the electrode assembly to the winding core.

In this context, provision may be made in a particularly advantageous manner for the ends of the wall of the winding core that is interrupted by the slot to overlap, thus achieving clamping in a particularly advantageous manner. Alternatively, provision may also be made for the end surfaces of the wall of the hollow cylinder, which surround the slot, to directly strike one another when pressed together.

Provision may also be made for the electrochemical energy storage cell to be characterized by one of the following features:
a. the outer circumferential surface of the winding core has one or more depressions for accommodating at least one sensor, and
b. the outer circumferential surface of the winding core has one or more depressions for accommodating at least one sensor, wherein the depression(s) extend(s) axially over preferably the entire height of the winding core.

This example is based on the fact that it is useful and/or necessary to monitor the operation of energy storage cells in many uses of the latter. It is therefore known practice to integrate a sensor system in electrochemical energy storage cells to be able to capture data relating to the temperature and/or the pressure inside the cell, for example. Furthermore, chemical sensors or voltage sensors are known in connection with energy storage cells, for example. The sensor system in an energy storage cell can be used to monitor the state and/or diagnose the energy storage cell.

Preferably, the energy storage cell therefore provides for one or more depressions to be provided in the outer circumferential surface of the winding core as local deviations, which depressions are used to accommodate one or more sensors. Depending on the intended position of the sensor in the energy storage cell, the depression may extend to a greater or lesser extent axially over the height of the winding core. It is also possible to provide a plurality of depressions at different positions on the outer circumferential surface of the winding core to accommodate a plurality of sensors. The conditions in the center of the wound composite body and therefore in the interior of the energy storage cell can be captured, in particular, using this possible position of one or more sensors in the energy storage cell.

Suitable sensors for this configuration of the energy storage cell are, for example, a reference electrode to measure the electrode potential of the cell and/or a temperature sensor to monitor the temperature, in particular to determine excessive heating, and/or a pressure sensor which can be used to determine, for example, an excessive development of pressure, in particular an increase in the cell internal pressure.

When configuring the outer circumferential surface of the winding core, an electrical conductor provided in the center of the wound composite body and similar structural elements can also be taken into account, for example. One or more depressions can therefore be provided in the outer circumferential surface of the winding core as local deviations, which depressions provide space for these additional structural elements and/or this electrical conductor.

Particularly preferably, the electrochemical energy storage cell is characterized by the following additional feature a.:
a. the winding core is formed from plastic or a plastic composite material.

Plastic is a widespread material for producing winding cores and can be easily processed. For example, winding cores having the local deviations from the cylindrical or hollow cylindrical shape can be produced as an injection-molded part. Another possibility is an extrusion process of producing the winding cores. In a corresponding manner, plastic composite materials can be used to produce the winding cores. Plastic and plastic composite materials also have the advantage that they are lightweight and do not contribute substantially to the weight of the resulting energy storage cell. In addition, they are electrically insulating and are therefore also particularly suitable for this reason as the material for the winding core for the energy storage cells.

The energy storage cell has a preferably cylindrical housing. In this example, cylindrical should not be understood in the strictly geometrical sense. The housing may perfectly well have deviations from a perfect cylinder, for example, in the region of a terminal housing closure or on the top side or the underside, which need not necessarily be completely flat. The housing casing or at least one segment of the housing casing preferably has a largely or completely constant outer radius and, in some examples, comes very close to a perfect circular cylinder in terms of its shape.

The housing is, in particular, a metal housing that is preferably formed from a positively poled and a negatively poled metal housing part. The housing parts may be composed, for example, of nickel-plated sheet steel, stainless steel (for example, of the type 1.4303 or 1.4304), copper, nickel-plated copper or alloyed or unalloyed aluminium. It may also be preferred for housing parts electrically connected to the cathode to be composed of aluminium or an aluminium alloy and for housing parts electrically connected to the anode to be composed of copper or a copper alloy or nickel-plated copper.

The positively poled housing part and the negatively poled housing part may be in the form of cups, for example. They then each have a circular cup base, a circumferential cup wall, a cup edge with a terminal cutting edge and a cup opening defined by the cup edge. The cup walls can preferably be described as annular segments of a hollow cylinder with a circular cross section. Their diameters preferably correspond either exactly to those of the respective associated circular base or are greater than them. The cup walls are generally oriented orthogonally with respect to the associated bases. In the assembled state, the cup bases correspond to the top side and the underside of the housing, while the cup walls form the annular circumferential housing casing.

It is also possible for one of the housing parts (positive or negative) to be in the form of a cup and have a circular opening, whereas the oppositely poled housing part is in the form of a disc or comprises a disc which closes opening.

An annular electrically insulating seal is preferably arranged between the housing parts.

With respect to the configuration of the housing casing and, in particular, the inner housing lateral surface, at least one of the immediately following additional features a. and b. is provided in one particularly preferred configuration of the electrochemical energy storage cell:
  a. the housing casing has a hollow cylindrical shape, and
  b. the housing casing has a local deviation from the hollow cylindrical shape in at least one region of its inner housing lateral surface.

The immediately preceding features a. and b. are particularly preferably implemented in combination.

This example is based on the fact that the above-described irregularities in the helical structure of the wound composite body can also occur in the outer region of the wound composite body and can result in non-uniform pressure loads in the outer region of the wound composite body. Since the outer circumferential surface of the wound composite body preferably adjoins the inner housing lateral surface in a two-dimensional manner, such irregularities in the helical structure and their disadvantageous effect on the function of the energy storage cell can be compensated for by the deviations from the hollow cylindrical shape. The irregularities in outer regions of the wound composite body are expressed, in particular, in a deviation from an ideal cylindrical shape or hollow cylindrical shape in the outer circumference of the wound composite body, which have a negative effect, in particular, in the event of expansion and shrinkage of the wound composite body while charging and discharging the energy storage cell. To compensate for such irregularities, deviations are preferably provided on the inner housing lateral surface in at least one region in a similar manner to the local deviation(s) explained above in the at least one region of the outer circumferential surface of the winding core.

Whereas the above-described local deviations in regions of the outer circumferential surface of the winding core are used to compensate for defects in the region of the inner composite body lateral surface, the deviations in the at least one region of the inner housing lateral surface are primarily suitable for compensating for defects in the region of the outer composite body lateral surface of the wound composite body. The measures according to our methods follow the principle that the shape of the inner housing lateral surface follows the progression of the irregularities on the outer circumference of the wound composite body, with the result that the outer composite body lateral surface can rest without discontinuities against the inner housing lateral surface.

Particularly advantageously, the local deviations in at least one region of the outer circumferential surface can be combined with the local deviations in the at least one region of the inner housing lateral surface, with the result that all irregularities which possibly occur in the inner region and in the outer region of the wound composite body can be compensated for.

However, it is also possible for deviations to be provided solely on the outer circumferential surface of the winding core or solely on the inner housing lateral surface. In principle, the examples in which the housing casing has a local deviation from the hollow cylindrical shape in at least one region of its inner housing lateral surface can therefore also be implemented independently of feature h.

The energy storage cell is preferably distinguished by the immediately following additional feature a.:
  a. the at least one region of the inner housing lateral surface having the deviation is spatially assigned to a local defect of the wound composite body.

As a result of this local assignment which can be configured in a similar manner to that described for the winding core, the energy storage cell allows pressure acting locally in the outer circumference of the wound composite body as a result of irregularities or defects in the outer region of the helical structure of the wound composite body to also be compensated for. In particular, the end of the cathodic electrode strip and the end of the anodic electrode strip contribute to such defects in the outer region of the helical structure of the wound composite body. In such wound composite bodies, two defects, in particular, generally occur in the outer circumference and are caused by the end of the respective electrode strips in the outer circumference of the wound composite body. In particular, these two defects can be compensated for by appropriate local deviations of the housing casing from the hollow cylindrical shape.

With respect to the configuration of this local deviation of the inner housing lateral surface, the energy storage cell is distinguished, in particular, by at least one of the immediately following additional features a to d.:
  a. the local deviation involves a stepped or continuous reduction and/or expansion of the inner diameter of the housing casing,
  b. the local deviation involves a stepped or continuous reduction and/or expansion of the inner diameter of the housing casing, wherein the stepped or continuous reduction and/or expansion of the inner diameter extend(s) axially over preferably the entire height of the housing,
  c. the local deviation involves a depression in the inner housing lateral surface and/or a curvature of the inner housing lateral surface, and
  d. the local deviation involves a depression in the inner housing lateral surface and/or a curvature of the inner housing lateral surface, wherein the depression and/or curvature extend(s) axially over preferably the entire height of the housing.

Combinations of depressions and curvatures which can be provided together are particularly suitable. An excessive local extent during charging/discharging processes can therefore be intercepted or picked up by a depression, wherein the helical structure can be held and supported in terms of its shape by a curvature.

To form the depressions and curvatures, provision may be made for the housing casing to be deliberately deformed. For example, webs made of plastic or another material can also be fixed to the inner housing lateral surface.

To implement the local deviation from the hollow cylindrical shape of the housing casing, the housing casing can also be reinforced by an annular insert which rests on the inner side of the housing casing. The insert preferably has a height of 50% to 100% of the height of the housing casing. The insert may have a thickness which is of the order of magnitude of the thickness of the housing casing. The inner diameter of the housing casing can be locally reduced, for example, by using an annular insert which has an increased thickness in at least one section. The inner diameter of the housing casing can be locally expanded, for example, by using an annular insert which has a reduced thickness in at least one section.

To locally expand the inner diameter of the housing casing, it is furthermore also possible to use a strip-like insert which rests against the inner side of the housing casing over its complete length, but cannot completely cover the inner side since it is shorter than the inner circumference of the housing casing. This insert preferably also has a height of 50% to 100% of the height of the housing casing and may have a thickness of the order of magnitude of the thickness of the housing casing.

Particularly preferably, the energy storage cell is a secondary lithium ion cell. Lithium ion cells are generally distinguished by the fact that they comprise electrodes which can reversibly absorb lithium ions and can release them again. Furthermore, they contain an electrolyte containing lithium ions. All materials which can absorb lithium ions and can release them again are possible as active materials for the electrodes of lithium ion cells.

Carbon-based materials such as graphitic carbon or non-graphitic carbon materials that are able to intercalate lithium are particularly suitable for the negative electrode of secondary lithium ion cells. Furthermore, it is also possible to use metallic and semi-metallic materials which can be alloyed with lithium. For example, the elements of tin, antimony and silicon are able to form intermetallic phases with lithium. In particular, the carbon-based active materials can also be combined with the metallic and/or semi-metallic materials. Alternatively or additionally, lithium titanate ($Li_4Ti_5O_{12}$) or a derivative thereof can also be included in the negative electrode.

Lithium metal oxide compounds and lithium metal phosphate compounds such as $LiCoO_2$ and $LiFePO_4$ are possible, for example, for the positive electrode of lithium ion cells and, in particular, of secondary lithium ion cells. Lithium nickel manganese cobalt oxide (NMC) with the empirical formula $LiNi_xMn_yCo_zO_2$ (where x+y+z is typically 1), lithium manganese spinel (LMO) with the empirical formula $LiMn_2O_4$ or lithium nickel cobalt aluminium oxide (NCA) with the empirical formula $LiNi_xCo_yAl_zO_2$ (where x+y+z is typically 1) are also highly suitable, in particular. Mixtures of the materials can also be used.

Electrode binders and conductive means can be primarily mentioned as electrochemically inactive components for lithium ion cells. The electrode binders ensure the mechanical stability of the electrodes and ensure that the particles of electrochemically active material make contact with one another and with the current collector. Conventional electrode binders are based, for example, on polyvinylidene fluoride, polyacrylate or carboxymethyl cellulose. Conductive means such as carbon black are used to increase the electrical conductivity of the electrodes.

Porous plastic films, for example, made from a polyolefin or from a polyether ketone, are possible, in particular, as separators for lithium ion cells. Non-woven fabrics and fabrics made from these materials can also be used.

As ion-conducting electrolytes, lithium ion cells may contain, for example, a mixture of organic carbonates, in which a lithium salt is dissolved. Any lithium salt which is known for lithium ion cells is fundamentally possible for this purpose. A prominent example of this is lithium hexafluorophosphate ($LiPF_6$). The electrodes and separators of lithium ion cells are preferably impregnated with the electrolyte.

Particularly preferably, the energy storage cell is distinguished by one of the following additional features:
  a. the electrochemical energy storage cell is a cylindrical round cell, in particular a secondary lithium ion cell in the form of a cylindrical round cell, or
  b. the electrochemical energy storage cell is a button cell, in particular a secondary lithium ion cell in the form of a button cell.

Cylindrical round cells have a height greater than their diameter. They are suitable, in particular, for applications in the automotive sector, for e-bikes or else for other applications with a high energy requirement.

The height of lithium ion cells in the form of a round cell is preferably 15 mm to 150 mm. The diameter of the cylindrical round cells is preferably 10 mm to 60 mm. Within these ranges, form factors of, for example, 18×65 (diameter times height in mm) or 21×70 (diameter times height in mm) are particularly preferred. Cylindrical round cells with these form factors are particularly suitable for supplying power to electrical drives of motor vehicles.

The nominal capacity of a lithium ion cell in the form of a cylindrical round cell is preferably up to 90,000 mAh. With the form factor of 21×70, the cell in a configuration as a lithium ion cell preferably has a nominal capacity of 1500 mAh to 7000 mAh, particularly preferably 3000 to 5500 mAh. With the form factor of 18×65, the cell in a configuration as a lithium ion cell preferably has a nominal capacity of 1000 mAh to 5000 mAh, particularly preferably 2000 to 4000 mAh.

In the European Union, manufacturer specifications with regard to details relating to the nominal capacities of secondary energy storage cells are strictly regulated. For instance, details relating to the nominal capacity of secondary nickel-cadmium energy storage cells must be based on measurements according to the standards IEC/EN 61951-1 and IEC/EN 60622, details relating to the nominal capacity of secondary nickel-metal hydride energy storage cells must be based on measurements according to the standard IEC/EN 61951-2, details relating to the nominal capacity of secondary lithium ion cells must be based on measurements according to the standard IEC/EN 61960 and details relating to the nominal capacity of secondary lead acid cells must be based on measurements according to the standard IEC/EN 61056-1. Any details relating to nominal capacities in the present application are preferably likewise based on these standards.

Just like cylindrical round cells, button cells are also cylindrical. However, they have a height (preferably 4 mm to 15 mm) which is equal to or preferably less than their diameter (preferably 5 mm to 25 mm). They are suitable, in particular, for supplying small electronic devices such as watches, hearing aids and wireless headphones with electrical energy.

The nominal capacity of the energy storage cell in the form of a button cell in a configuration as a lithium ion cell is preferably up to 1500 mAh. More preferably, the nominal capacity is 100 mAh to 1000 mAh, particularly preferably 100 800 mAh.

We also provide a method of producing an electrochemical energy storage cell, which method is characterized by the following method steps:
a. at least two electrodes strips each having a strip-like current collector with an active material coating on both sides and at least one separator strip arranged between the electrode strips are provided,
b. a winding core having a substantially cylindrical or hollow cylindrical shape is provided and has an outer circumferential surface, wherein the outer circumferential surface of the winding core has a deviation from a cylindrical or hollow cylindrical shape in at least one region,
c. to produce a wound composite body, the electrode strips and the at least one separator strip are helically wound around the winding core to form a helical structure, wherein the winding is carried out such that the deviation is spatially assigned to a local defect in the helical structure,
d. a cylindrical housing for the energy storage cell is provided,
e. the wound composite body is introduced into the housing, and
f. electrical contact is made with the wound composite body and the housing is closed.

The essence of this method is that a substantially cylindrical or hollow cylindrical winding core is used to produce the wound composite body, wherein the outer circumferential surface of the winding core has a deviation from a cylindrical or hollow cylindrical shape in at least one region. This deviation or possibly a plurality of deviations can be used to compensate for irregularities in the helical structure of the wound composite body.

In this method, provision is also made for the deviation to be spatially assigned to a local defect in the helical structure of the wound composite body, with the result that it is possible for negative effects of an unequal pressure distribution caused by the structural irregularities to be compensated for in a particularly effective manner.

Particularly preferably, the spatial assignment is achieved by using an accordingly shaped winding mandrel, onto which the winding core shaped in a hollow cylindrical manner can be pushed to achieve appropriate positioning of the electrode assembly to be wound onto the winding core. In this example, it is particularly advantageous if the inner wall of the winding core shaped in a hollow cylindrical manner directly or indirectly represents the deviation in the outer circumference of the winding core, with the result that only one position of the winding mandrel of accordingly diametrically opposite shape within the winding core is possible, for example. This makes it possible to ensure the correct localization of the winding core on the winding mandrel in relation to the wound composite body to be wound.

The energy storage cell that can be produced using this method is, in particular, an energy storage cell having the features already explained above. With respect to further features of the energy storage cell and, in particular, of the winding core and therefore also with respect to further features of the production method, reference is therefore also made to the above description.

Finally, we provide a winding tool that can be used to carry out the production method. In particular, the winding tool comprises a winding mandrel or the winding tool is a winding mandrel, wherein the winding mandrel is shaped in accordance with the formed winding core. In particular, if the winding core is hollow cylindrical and the inner core lateral surface of the winding core emulates the deviation(s) on the outer circumferential surface of the winding core, such a winding mandrel preferably has a diametrically opposite shape in its outer circumferential surface that corresponds to the inner core lateral surface of the winding core. The winding tool and, in particular, the winding mandrel can, as it were, represent the interior of the winding core as a negative. In correspondence with the inner circumference or the inner core lateral surface of the winding core, the winding mandrel may have a cam, for example, if the winding core exhibits a depression at this position.

Such a winding tool can be used to produce a wound composite body in a particularly practical manner, in which the start of the winding on the winding core can be located in a very precise manner and the spatial assignment of one or more deviations on the outer circumferential surface of the winding core to local defects in the wound composite body can be achieved in a particularly precise manner.

Further features and advantages emerge from the following description of preferred examples in conjunction with the drawings. Individual features can each be implemented alone or in combination with one another.

Figure 1:
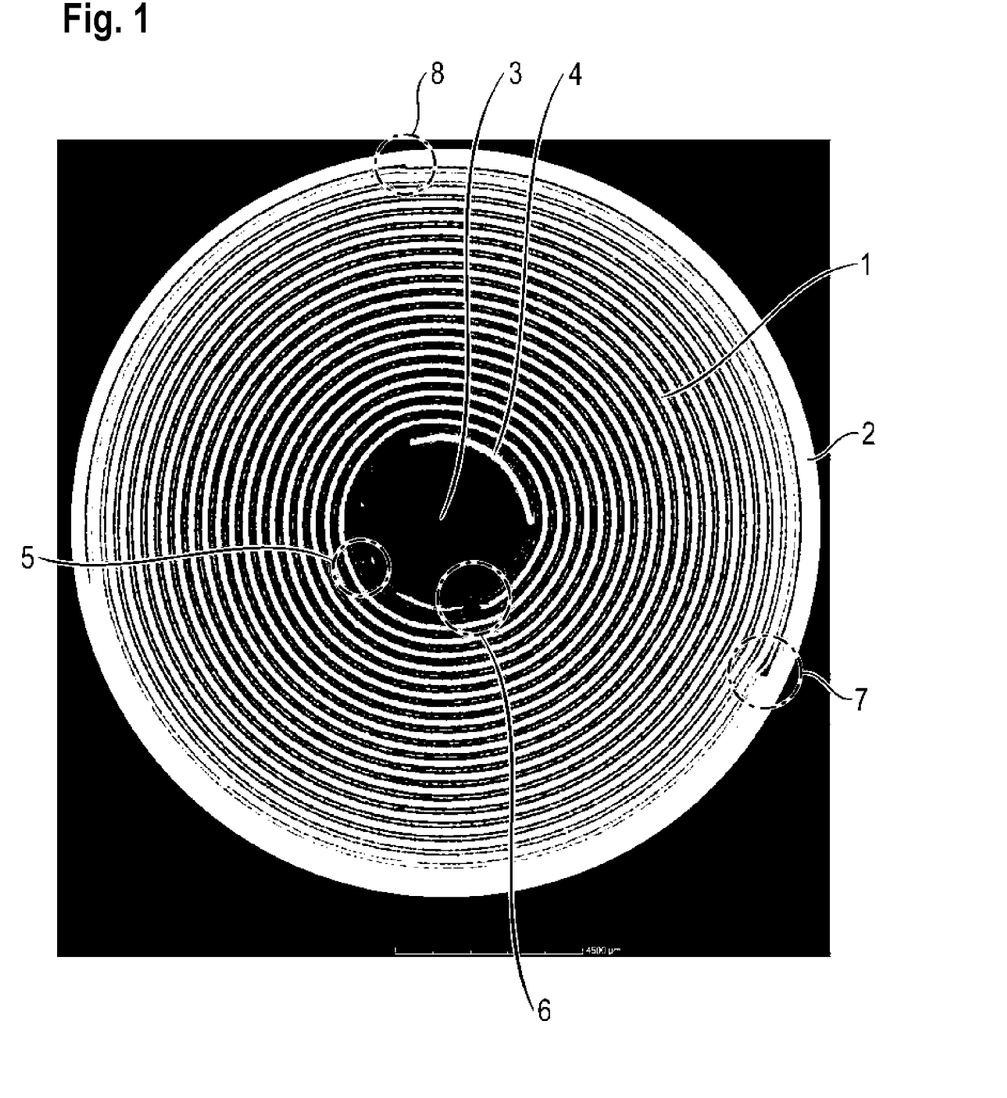
FIG. 1 shows a cross section through a wound composite body having a housing of an energy storage cell of the prior art.

FIG. 1 illustrates the problem in conventional energy storage cells having a wound composite body shaped in a hollow cylindrical manner. The illustration is based on an X-ray that shows a cross section through a button cell. However, the situation illustrated is likewise found in cylindrical round cells. The wound composite body 1 is formed by helically wound electrode strips and separator strips in between. The wound composite body 1 is situated inside an interior of the energy storage cell that is surrounded by a housing casing 2 of a cylindrical housing. In this configuration, there is no winding core in the center 3 of this conventional energy storage cell shown here or in the center of the wound composite body 1. Electrical contact is made with one of the electrodes via a metal conductor 4 in the inner region of the wound composite body 1.

The layer thickness of the separator strips may be around 20 μm, for example. The layer thickness of the cathodic electrode strips may be around 150 μm, for example. The layer thickness of the anodic electrode strips may be around 100 μm, for example. Depending on the design, the thickness of the separators may also be approximately 12 μm or 16 μm, for example. Depending on the design, the coated electrode strips may also be in a thickness of 110 μm±15 μm.

Local defects 5, 6, 7, 8 can be seen in various regions of the helical structure of the wound composite body 1 and are formed by different transition regions and ends of electrode strips when producing the wound composite body 1.

If the helical structure of the wound composite body 1 in FIG. 1 is viewed from the inside out, the winding initially begins solely with a few turns of the anode current collector, to which the conductor 4 is welded. After a few turns, the transition to a section of the anode current collector that is coated on both sides with an active material coating is found at the position referred to as defect 5. The inner end of the cathodic electrode strip is found at the position referred to as defect 6. The end of the cathodic electrode strip is situated in the outer region of the wound composite body 1 at the position referred to as defect 7. The outer end of the anode current collector is situated at the position referred to as defect 8. These defects 5, 6, 7, 8 in various regions of the helical structure of the wound composite body 1 result in irregularities in the approximately circular shape of the individual turns, which irregularities can also affect adjacent turns.

In connection with volume expansions and volume shrinkage's during charging and discharging operations in particular, non-uniform pressure distributions are caused thereby and have a disadvantageous effect on the function of the energy storage cell. In particular, these may result in soft short circuits and short circuits on account of a higher load on the separator at the irregularities, in particular at the start of the winding, that is to say in the center of the wound composite body 1, as a result of the pressure load and/or in disadvantageous lithium plating.

To avoid such problems in wound composite bodies, we provide a particular shape for a winding core that is situated in the center of the wound composite body. Such a special shape of the winding core makes it possible, in particular, to avoid the problems that arise in the interior of the wound composite body.

Figure 2A:
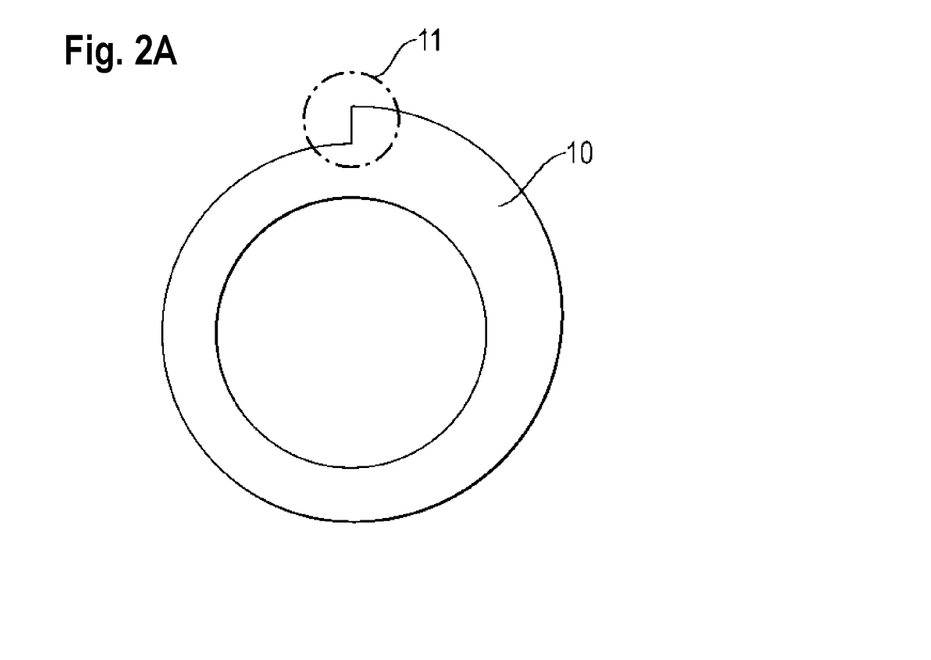
FIGS. 2A and 2B show configurations of a hollow cylindrical winding core of the wound composite body of our energy storage cell.

FIG. 2 shows two possible examples of the shape of the winding core 10. In its outer circumferential surface (a cross section is shown here), the winding core 10 has a deviation 11 from an ideal hollow cylindrical shape of the winding core, wherein a stepwise expansion of the outer diameter is achieved here in the sectional plane shown here (FIG. 2A) in the viewing direction from left to right. The deviation 11 can be used to connect the electrode assembly to the winding core 10 at this location, for example, by welding or adhesively bonding the separator strips at this location. The special shape of the winding core 10 in this instance avoids edges or generally irregularities in the helical structure, which is being constructed, occurring in subsequent windings above the start of the winding at the position 11. Overall, this achieves a considerable increase in the homogeneity of the winding in terms of its roundness, with the result that uniform tensile forces act, in particular in volume increases and volume decreases, during the charging and discharging operations in the energy storage cell. There are point-type pressure loads at transition points, thus avoiding the risk of cracking. An excessive load on the separator, in particular in the inner region of the helical structure of the wound composite body, is likewise avoided, with the result that lithium plating or other disadvantageous effects of such irregularities are also avoided, for example.

Figure 2B:
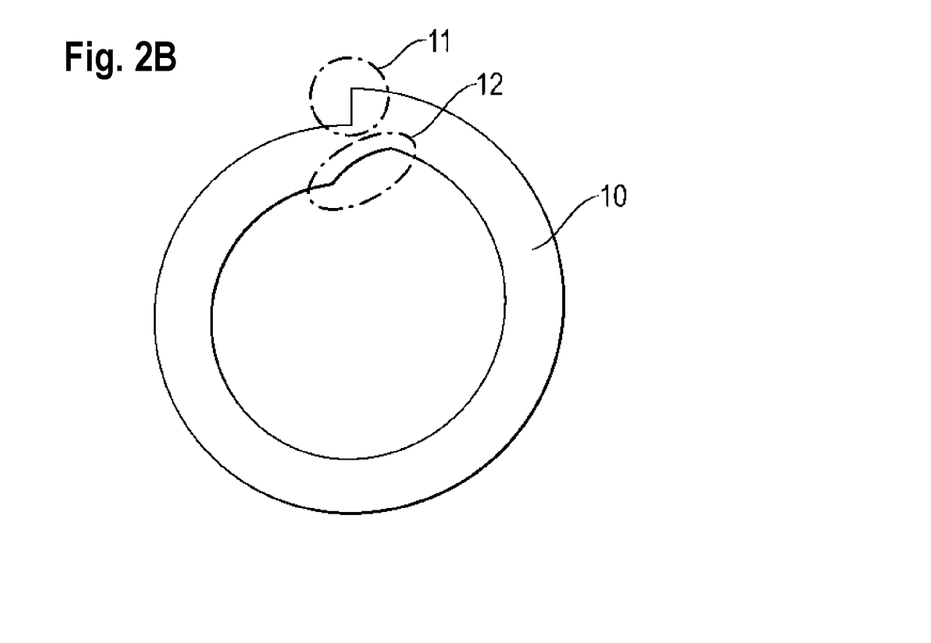

FIG. 2B shows a further possible configuration of the winding core 10 with the deviation 11 in the outer circumference, wherein an adaptation 12 corresponding to the deviation 11 in the outer circumferential surface was made in the wall thickness in the inner core lateral surface of the hollow cylindrical winding core. The deviation 11 in the form of the stepped increase in the outer circumference is represented on the inner circumference in a stabilized form as the adaptation 12. The adaptation 12 on the inner core lateral surface of the winding core 10 is therefore shaped in a similar or corresponding manner to the deviation 11 on the outer circumferential surface of the winding core 10. This has the advantage that exact alignment with the start of the winding is possible in a particularly simple manner when producing the wound composite body.

Depending on the dimensioning of the energy storage cell, the dimensions of the winding core, which is preferably produced from plastic, can be adapted. For example, the outer diameter of the winding core for a button cell may be 2 to 3 mm, for example, 2.1 mm.

Figure 3A:
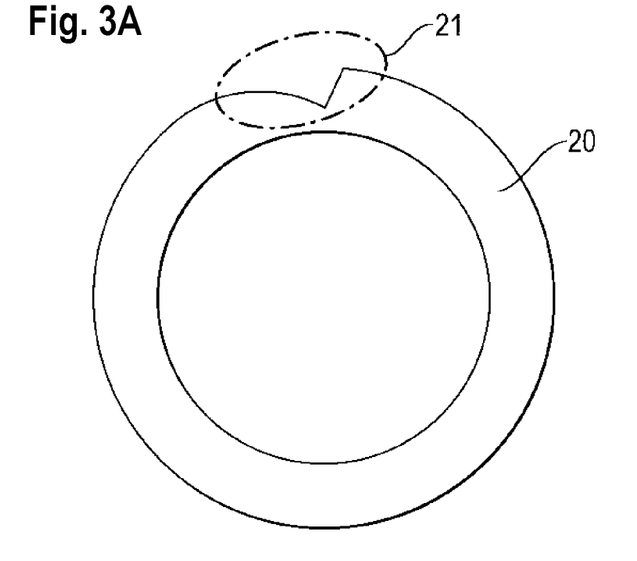
FIGS. 3A and 3B show further configurations of a hollow cylindrical winding core of the wound composite body of our energy storage cell.

FIG. 3 shows further possibilities of configuring the shape of the winding core 20. In this example, a notch is present in the winding core 20 shaped in a hollow cylindrical manner in FIG. 3A as a deviation 21, which notch exhibits a continuous transition to the wall thickness outside the local deviation 21 on the left-hand side and exhibits a stepwise or abrupt transition to the wall thickness outside the deviation 21 on the right-hand side. In the local deviation 21 in the form of a notch in the outer circumference of the winding core 20, the separator strips forming the end of the electrode assembly can be fastened, for example, to the winding core 20, for example, by welding or adhesive bonding, with the result that an edge is not formed or similar distortions do not occur.

In addition, the winding core 20 or generally the winding core may also include further local deviations in the outer circumference which are able to compensate for further transition regions or irregularities in the helical structure of the wound composite body to be fitted thereto. In particular, a corresponding taper or notch in the outer circumferential surface of the winding core may be provided at those defects at which particular thickness changes take place as a result of the electrode coatings.

Figure 3B:
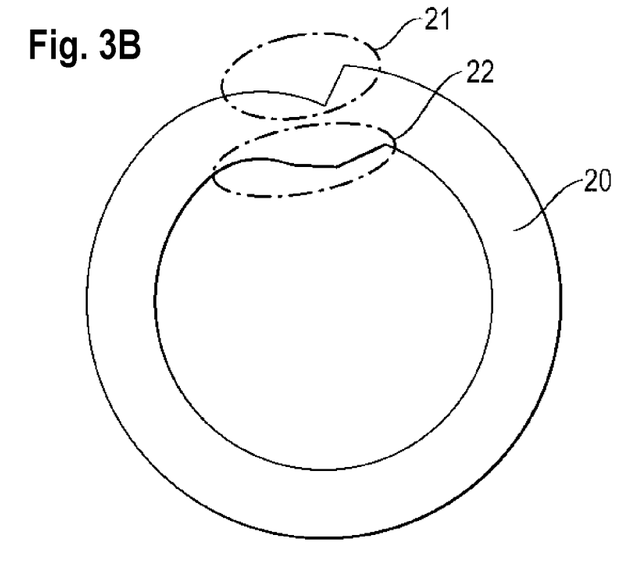

FIG. 3B shows a further possibility of configuring the winding core 20, wherein a similar shape of the inner core lateral surface is implemented in the inner core lateral surface of the winding core 20 at the position 22 opposite the deviation 21 in the outer circumferential surface. This compensates for the wall thickness in this region, as a result of which the advantages already described on the basis of FIG. 2 are achieved.

Figure 4:
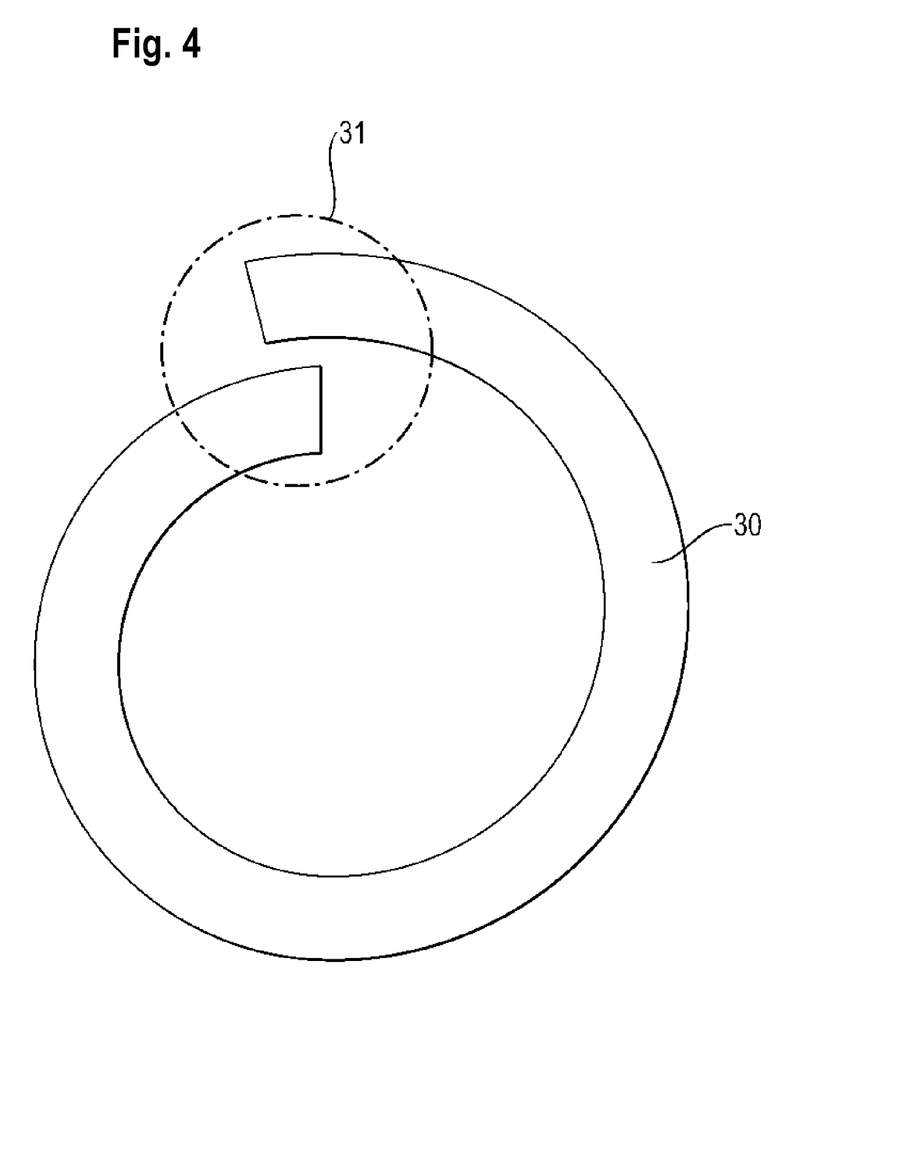
FIG. 4 shows a further configuration of a hollow cylindrical winding core of the wound composite body of our energy storage cell.

FIG. 4 shows a further possibility for configuring a winding core 30 with a deviation 31 which, with formation of a slot through the wall of the hollow cylindrical winding core 30, is configured with overlapping ends of the wall. This provides a clamping position which can be used to clamp an end of a separator strip on the winding core 30, for example, with the result that there is no need for any further fastening, for example, welding, and a uniform helical structure can be achieved at the same time in the wound composite body.

Figure 5:
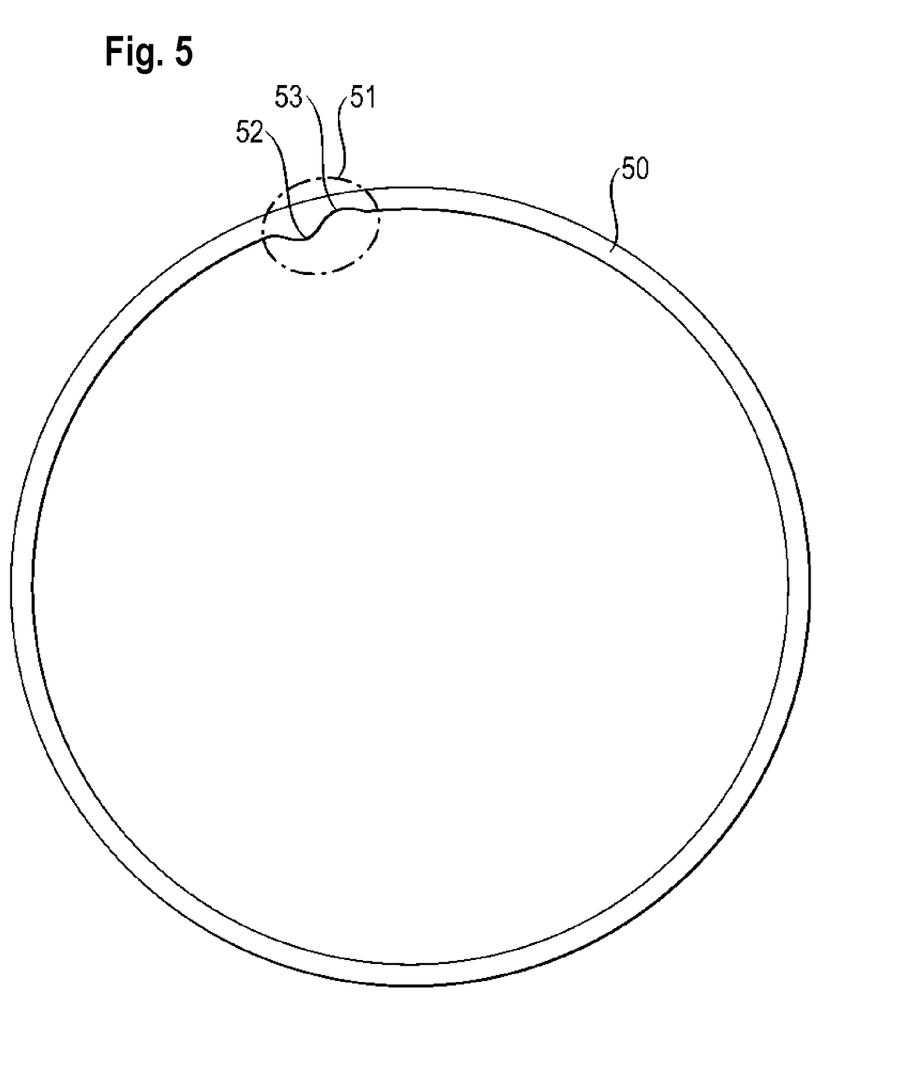
FIG. 5 shows a configuration of the housing of our energy storage cell.

In a similar manner to the deviations in the outer circumferential surface of the winding core, the housing 50 surrounding the wound composite body can be configured with deviations in the inner circumferential surface to compensate for irregularities or defects in the outer region of the wound composite body. FIG. 5 shows a deviation 51 in the inner housing lateral surface of the housing casing 50, wherein a curvature 52 in the direction of the wound composite body to be arranged in the interior is combined with a depression 53, in which the wall thickness of the housing casing 50 is reduced. In this instance, the depression 53 may compensate for local pressure spikes as a result of non-uniform volume increases. The curvature 52 may provide a supportive structure to moreover stabilize the helical structure. Such a configuration as a deviation 51 in the housing casing 50 can be used, for example, to compensate for a defect according to position 8 in FIG. 1.

Figure 6:
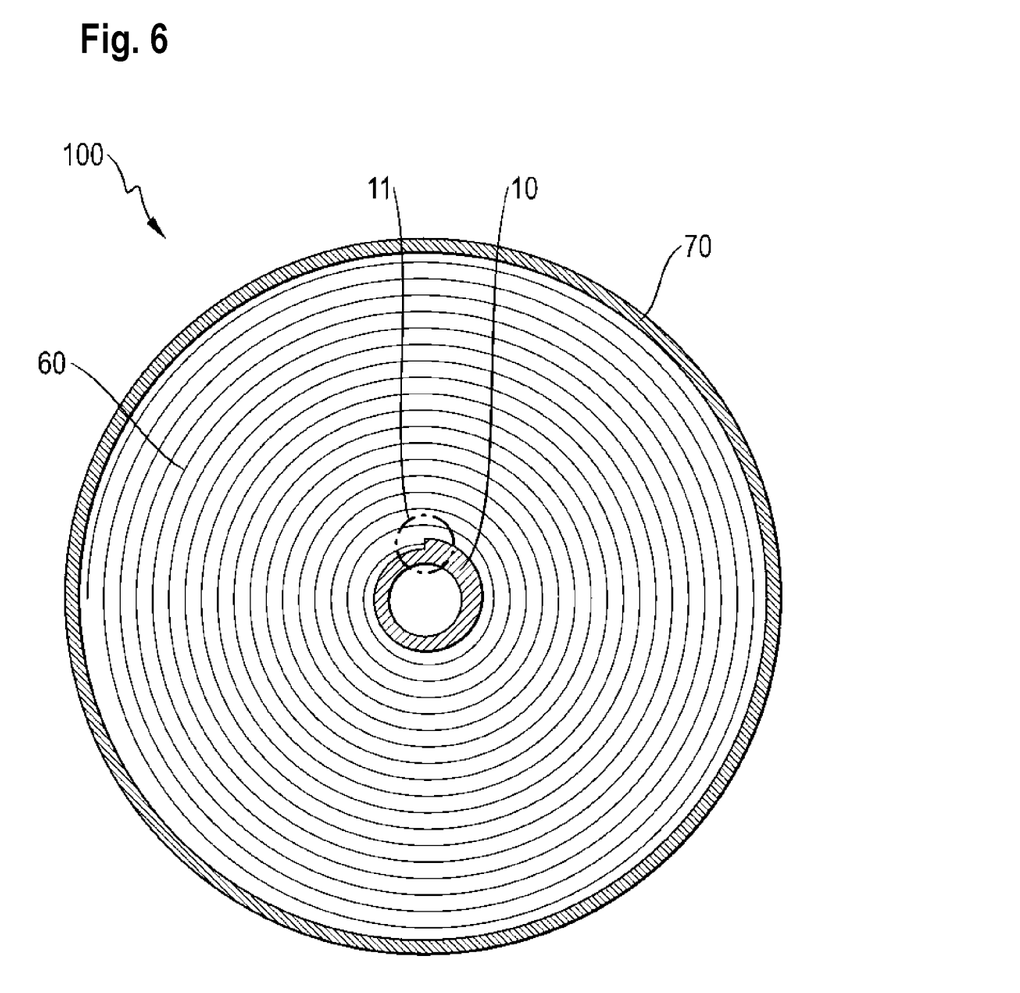
FIG. 6 shows an example of our energy storage cell.

FIG. 6 shows a schematic sectional illustration through an electrochemical energy storage cell 100 having a wound composite body 60 situated in the interior of a housing 70. A winding core 10 which is distinguished by a deviation 11 in the form of a stepped expansion of the outer diameter of the winding core is situated in the center of the wound composite body 60. This winding core 10 corresponds to the configuration of the winding core shown in FIG. 2A. An end of an electrode strip can be placed against the step present in the outer circumferential surface in the region of the deviation 11. This makes it possible to prevent the formation of an edge and consequently resulting irregularities in the helical structure.

Overall, our energy storage cells are distinguished by a more uniform winding of the wound composite body. This has a positive effect on the winding quality and minimizes failures, in particular as a result of conventionally occurring edges which are not present in the energy storage cell. In addition, the process of producing the energy storage cell and the winding process can also be optimized in the described manner. Furthermore, in our energy storage cells, it is possible to use more free volume in the energy storage cell, thus additionally resulting in a potential for increasing capacity.

Figure 7:
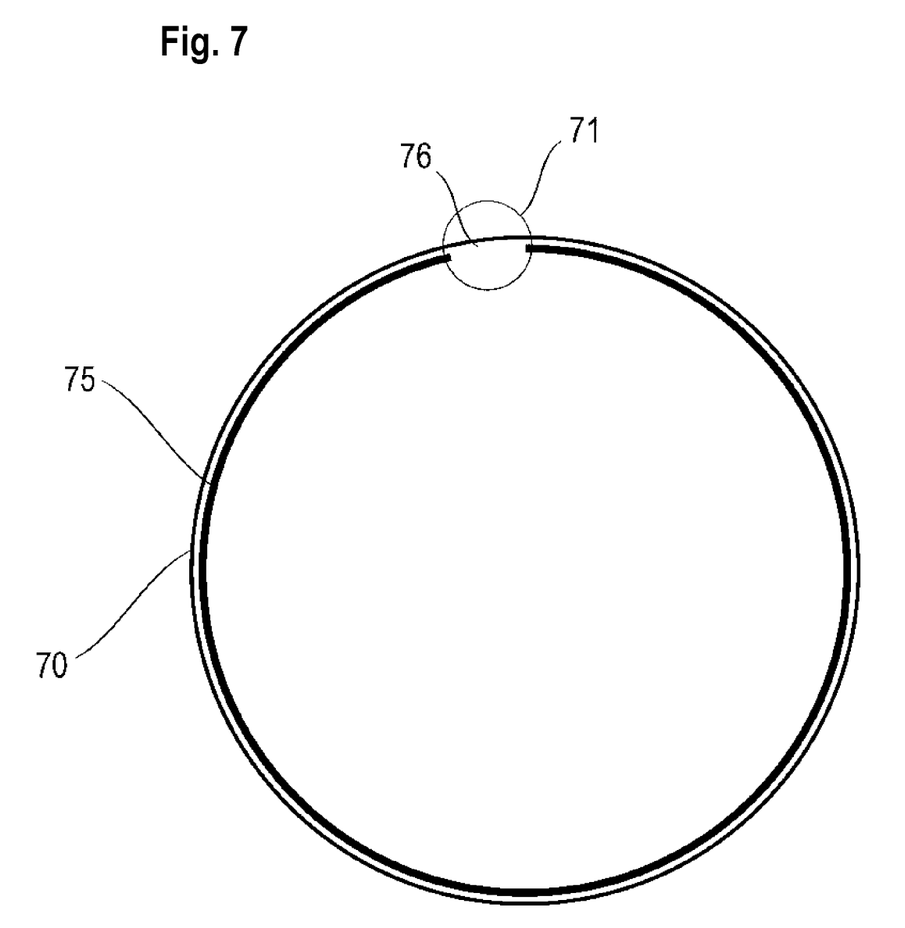
FIG. 7 shows a further example of the housing of our energy storage cell.

FIG. 7 shows a further example of how the local deviation 71 from the hollow cylindrical shape of the housing casing 70 can be implemented. For this purpose, the housing casing 70 can be reinforced by a strip-like insert 75 that rests against the inner side of the housing casing 70 over its complete length, but cannot completely cover the inner side since it is shorter than the inner circumference of the housing casing 70. The inner diameter has been expanded in comparison with all other sections in the section 76 in which the strip-like insert 75 does not cover the inner side.

The invention claimed is:

1. An electrochemical energy storage cell comprising:
   a. a cylindrical housing that encloses an interior space and has a top side and an underside and a circumferential housing casing in between,
   b. the housing casing has an inner housing lateral surface that delimits the interior to the outside,
   c. a wound composite body shaped in a hollow cylindrical manner is arranged in the interior space and has a helical structure comprising at least two electrode strips helically wound around a winding axis and at least one separator strip arranged between the electrode strips, wherein there is no direct electrical contact between the two electrode strips,
   d. the electrode strips each comprise a strip-shaped current collector having an active material coating on both sides,
   e. the wound composite body shaped in a hollow cylindrical manner comprises two terminal end faces, a circumferential outer composite body lateral surface and a circumferential inner composite body lateral surface,
   f. the inner composite body lateral surface defines an axially oriented cavity in the center of the wound composite body,
   g. a winding core having a substantially cylindrical or hollow cylindrical shape is arranged in the axially oriented cavity and has an outer circumferential surface that rests flat on the inner composite body lateral surface, and
   h. the winding core has a local deviation from the cylindrical or hollow cylindrical shape in at least one region of the outer circumferential surface,
      wherein the helical structure of the wound composite body comprises at least one local irregularity in at least one region in which one of the wound electrode strips ends and/or there is a sudden change in the thickness of one of the electrode strips, and
      the at least one region of the outer circumferential surface of the winding core, in which the local deviation from the cylindrical or hollow cylindrical shape occurs, is spatially assigned to the local irregularity of the wound composite body in the at least one region in which one of the wound electrode strips ends and/or there is a sudden change in the thickness of one of the electrode strips.

2. The electrochemical energy storage cell according to claim 1 having at least one of:
   a. the local deviation from the cylindrical or hollow cylindrical shape involves a stepped or continuous reduction and/or expansion of the outer diameter of the winding core, and
   b. the local deviation involves at least one stepped or continuous reduction and/or expansion of the outer diameter of the winding core, wherein the at least one stepped or continuous reduction and/or expansion of the outer diameter extends axially over preferably the entire height of the winding core.

3. The electrochemical energy storage cell according to claim 1 having at least one of:
   a. the local deviation in the at least one region of the outer circumferential surface of the winding core involves a depression in the outer circumferential surface of the winding core and/or a curvature of the outer circumferential surface of the winding core, and
   b. the local deviation in at least one region of the outer circumferential surface of the winding core involves a depression in the outer circumferential surface of the winding core and/or a curvature of the outer circumferential surface of the winding core, wherein the depression and/or the curvature extend(s) axially over preferably the entire height of the winding core.

4. The electrochemical energy storage cell according to claim 1 having at least one of:
   a. the winding core is in the form of a hollow cylinder and has an inner core lateral surface that delimits an axially oriented cavity in the interior of the winding core,
   b. the winding core has, as a local deviation, a depression in the outer circumferential surface and a corresponding curvature projecting into the axially oriented cavity, and
   c. the winding core has, as a local deviation, a curvature of the outer circumferential surface and a corresponding depression in the inner core lateral surface.

5. The electrochemical energy storage cell according to claim 1 wherein
   a. the local deviation in the at least one region of the outer circumferential surface of the winding core in the form of a hollow cylinder comprises an aperture in the wall of the winding core or a slot in the wall.

6. The electrochemical energy storage cell according to claim 1 having at least one of:
   a. the outer circumferential surface of the winding core has one or more depressions to accommodate at least one sensor, and
   b. the outer circumferential surface of the winding core has one or more depressions to accommodate at least one sensor, wherein the depression(s) extend(s) axially over preferably the entire height of the winding core.

7. The electrochemical energy storage cell according to claim 1 having at least one of:
   a. the housing casing has a hollow cylindrical shape, and
   b. the housing casing has a local deviation from the hollow cylindrical shape in at least one region of its inner housing lateral surface.

8. The electrochemical energy storage cell according to claim 7, wherein
   a. the at least one region of the inner housing lateral surface having the local deviation is spatially assigned to a local defect of the wound composite body.

9. The electrochemical energy storage cell according to claim 7 having at least one of:
   a. the local deviation involves a stepped or continuous reduction and/or expansion of the inner diameter of the housing casing,
   b. the local deviation involves a stepped or continuous reduction and/or expansion of the inner diameter of the housing casing, wherein the stepped or continuous reduction and/or expansion of the inner diameter extend(s) axially over preferably the entire height of the housing,
   c. the local deviation involves a depression in the inner housing lateral surface and/or a curvature of the inner housing lateral surface, and
   d. the local deviation involves a depression in the inner housing lateral surface and/or a curvature of the inner housing lateral surface, wherein the depression and/or curvature extend(s) axially over the entire height of the housing.

10. The electrochemical energy storage cell according to claim 1 having one of:
   a. the electrochemical energy storage cell is a cylindrical round cell, or
   b. the electrochemical energy storage cell is a button cell.

11. A method of producing an electrochemical energy storage cell comprising:
   a. arranging at least one separator strip between at least two electrodes strips each having a strip-like current collector with an active material coating on both sides,
   b. providing a winding core having a substantially cylindrical or hollow cylindrical shape and an outer circumferential surface, wherein the outer circumferential surface of the winding core has a deviation from a cylindrical or hollow cylindrical shape in at least one region,
   c. producing a wound composite body by helically winding the electrode strips and the at least one separator strip around the winding core to form a helical structure, wherein the winding is carried out such that the deviation is spatially assigned to a local defect in the helical structure,
   d. providing a cylindrical housing for the energy storage cell,
   e. introducing the wound composite body into the housing, and
   f. electrically contacting the wound composite body and the housing and closing the housing.

\* \* \* \* \*